Patented Aug. 22, 1933

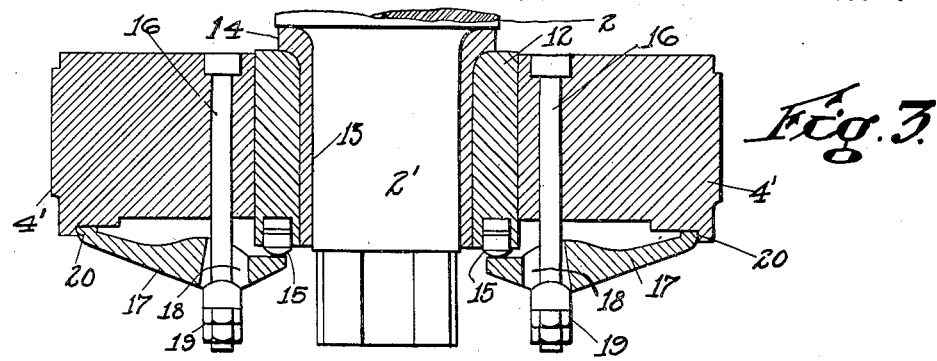
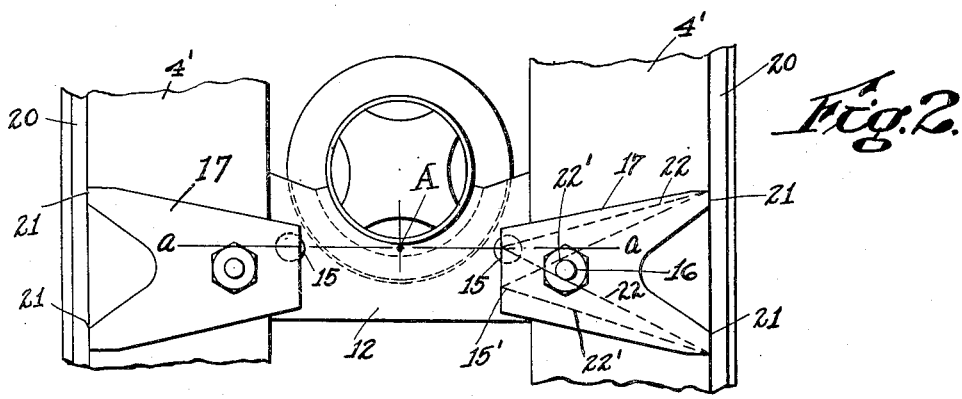
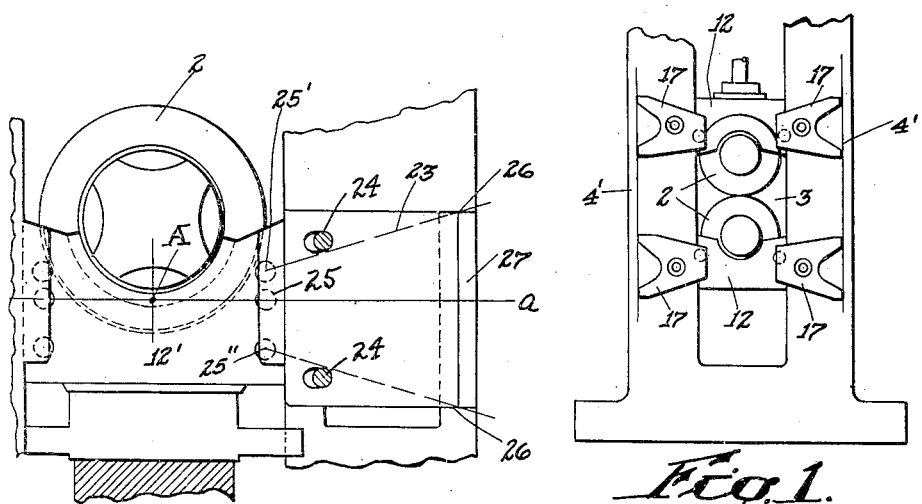

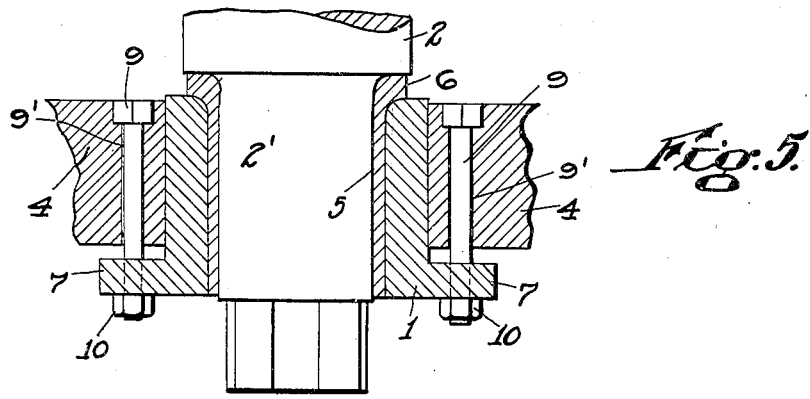
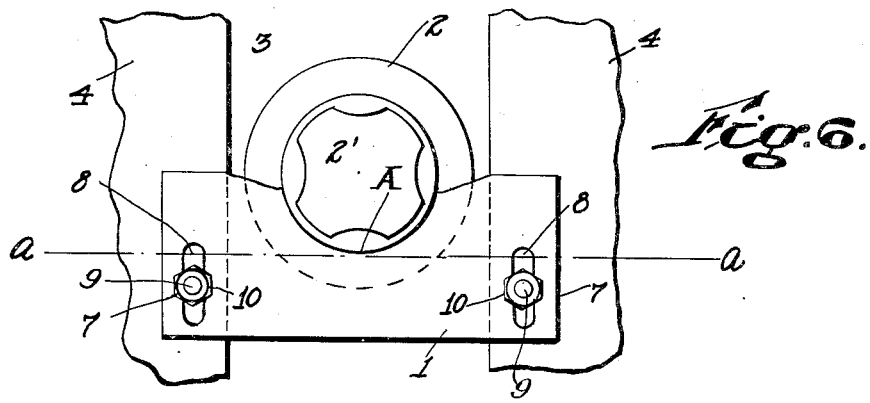
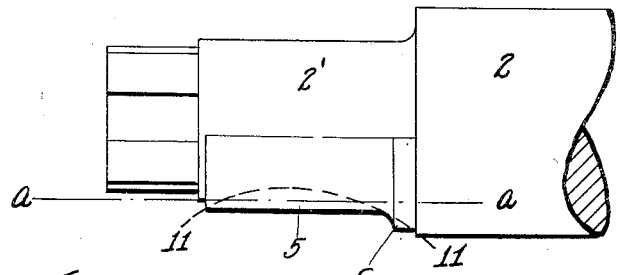

1,923,782

UNITED STATES PATENT OFFICE 1,923,782

RETAINING MEANS FOR ROLLING MILL BEARINGS

Jerome R. George, Worcester, Mass., assignor to Morgan Construction Company, Worcester, Mass., a Corporation of Massachusetts Application April 4, 1930. Serial No. 441,582

18 Claims. (Cl. 308—59)

The present invention relates in general to bearings such as are used for the rolls of rolling mills, and in particular, to the means employed for the retention of such bearings in the roll housings.

The heavy pressures produced by rolling operations invariably impose extremely severe strains on the roll bearings, with the result that the linings of said bearings, usually of babbitt or similar material, are subject to very rapid wear. The usual roll-bearing lining has a concave seat portion in contact with and encircling approximately one-half of the reduced end or neck of the roll, and also an integral end portion flared radially outward to bear against the end of the roll body or barrel at the shoulder between said body and said neck. This shoulder portion of the bearing lining not only is subject to very rapid wear, on account of its exposure to the water and scale from the rolling operation, but suffers even more severely than the seat portion of the lining from those pressures and strains of the rolling operation which tend to throw the roll out of level or to thrust it endwise.

The roll bearing must be so held as to resist the endwise thrust, but must have sufficient freedom of movement to conform itself to out-of-level operation of the roll. Heretofore, all attempts to fulfill these conditions have been at the expense of extremely rapid and unequal wear of the bearing lining, particularly the portion thereof contacting with the end of the roll body;—this being due to the inability of all previous bearing-retaining devices to preserve with relation to the lining's area of contact with the end of the roll body, any fixed locus of retaining pressure, under the changing conditions brought about by shifting of the roll axis during the rolling operation, or by the vertical adjustments of the bearing made from time to time to take up wear, or to vary the spacing between cooperating rolls.

The present invention overcomes the above difficulties, through an arrangement and combination of parts which maintains the direction of the retaining pressure, under all conditions, in a predetermined particular relation to the bearing's area of contact with the said shoulder,—this relation being the only one that does not result in conditions of unequal and rapid wear. In other words, by my invention the bearing is held and retained in such a manner that, notwithstanding the roll's operation in out-of-level or other position ordinarily tending to concentrate wear on a relatively small surface of the lining, the latter will have the wear distributed practically uniformly over its entire surface. Furthermore, the retaining means of my invention fulfills the objects above set forth while still permitting the bearing to undergo such vertical adjustments as may be needed from time to time in order to take up for wear or to vary the spacing between cooperating rolls. Other and further objects and advantages of the invention will be apparent from the following detailed description thereof, taken in connection with the accompanying drawings, in which —

Fig. 1 is an end view of a roll housing equipped with my invention.

Fig. 2 is a fragmentary large scale view of the invention, in end elevation.

Fig. 3 is a horizontal sectional view, substantially on the line a—a of Fig. 2.

Fig. 4 is a view similar to Fig. 2, showing a different form of the invention.

Figs. 5 and 6 are fragmentary views, in horizontal section and end elevation, respectively, and typical of the ordinary retaining arrangements for rolling mill bearings.

Fig. 7 is a diagrammatic view, illustrating the unequal wear of the bearing lining, when the retaining arrangements of Figs. 5 and 6 are employed.

Like reference characters refer to like parts in the different figures.

Referring first to Figs. 5 and 6, I have shown a conventional arrangement of retaining means as applied to the supporting bearing block 1 of the lower roll 2 of a pair of reducing rolls,— the same arrangement being applicable, of course, to the holding-down bearing of the upper roll, not shown. The bearing block 1, as shown, is received in the usual "window" or opening 3 between the spaced uprights 4, 4 that constitute one side of the roll housing, and said bearing block has a babbitt or other suitable lining 5; said lining, according to the usual practice, consists of a concave portion receiving the reduced neck 2' of the roll, and at the inner end thereof a shoulder portion 6, whose area of contact with the end of the roll body is represented by broken hatch lines in Fig. 6. The outer end of the bearing block 1 provides the usual lateral flanges 7, 7 that overlap the uprights 4, 4 of the housing, in position to receive, in elongated slots 8, 8 thereof, the retaining bolts 9, 9 mounted for limited movement in slots 9', 9' of the housing, and having on their ends the nuts 10, 10 by which to exert the desired retaining pressure on the bearing.

Such retaining pressure in the arrangement above described is, of necessity, always exerted axially of the bolts 9, 9, whatever the positions they may assume in the operation of the roll. But only in one single relation of the bearing block 1 and bolts 9, 9 is it possible to hold the bearing in such a way as to prevent uneven wear on the lining 5, 6. That is to say, referring to Fig. 6, the ideal condition, under which practically uniform wear of the lining is obtained, is present only when the bolts 9, 9 occupy a horizontal plane $a, a$ which contains the center of gravity A of the area of contact between lining portion 6 and the end of the roll body; inasmuch as this relation, even if initially established, is upset every time the roll gets out of level, and is totally lost upon any vertical adjustment of the bearing as permitted by the slots 8, 8, it will readily be seen that in actual practice the bearing lining is almost constantly working under conditions that cause concentration of the wear on relatively small surfaces of the shoulder portion 6, or of the concave portion 5. Fig. 7 illustrates the effect of wear when the plane $a, a$, Fig. 6, is either above or below the axes of the bolts 9, 9; not only is the shoulder portion 6 of the lining worn down more rapidly, by excessive pressure of the roll body against a limited area thereof, but the concave portion 5 of said lining, instead of wearing uniformly, is worn mostly at its ends, as shown in exaggerated fashion by the broken line 11, 11.

My invention overcomes all of the above described difficulties by a retaining arrangement for the roll bearings which causes the endwise retaining pressure to be exerted always substantially in the plane $a, a$, regardless of out-of-level operation of the roll, or of vertical adjustments made from time to time in the position of the bearing. Referring now to Figs. 2 and 3 for an illustration of my invention, I provide for each roll neck a bearing block 12, which is equipped, as shown, with the usual lining of babbitt, or the like, said lining consisting of a concave seat portion 13 and a flared portion 14, the same as the lining 5, 6 of Fig. 5. The bearing block 12, unlike the block 1 of Figs. 5 and 6, has no flanges or other equivalent projections overlapping the housing uprights 4', 4' to serve as attaching means in holding the block against endwise movement; instead, the outer end of said block 12, here shown as projecting slightly beyond the faces of the housing uprights 4', 4', provides, on opposite sides of the concave recess thereof, a pair of outwardly projecting buttons 15, 15, preferably of hardened steel and presenting substantially spherical surfaces; these buttons 15, 15, held in place in any suitable manner, are permanently located substantially in the plane $a, a$ which contains the center of gravity A of the area of contact between the lining shoulder portion 14 and the end of the roll body 2. Each upright 4' of the housing side provides, in proximity to the adjacent button 15, a relatively stationary bolt 16, whose outer end projects well beyond the spherical surface of the button. To render said bolt in each case effective as a retaining device for the bearing 12, I associate with it a clamping member or dog 17 of the special construction shown in the drawings, said dog having a laterally elongated slot 18 for the passage of bolt 16. The dog 17, as held in its operative position on the bolt 16 by the latter's retaining nuts 19, 19, has its outer extremity drawn into contact with a flanged surface 20 of the housing upright 4', and has its inner end drawn toward the extremity of the bearing block 12, but contacting only with the spherical button 15 thereof. That is to say, the clamping member or dog 17 has virtually a three-point seating, there being a two-point or line contact, as indicated at 21, 21, with the guiding flange surface 20 of the housing upright, and a single-point contact with the end of the bearing block, the latter contact, by virtue of the outward projection of the spherical button 15, which prevents the dog from engaging any other portion of the end surface of block 12, being always in the plane $a, a$ that passes substantially through the center of gravity of the contact area of the lining portion 14 with the end of the roll body.

Hence the retaining pressure on the bearing, being secured by contact of the dogs 17, 17 with the buttons 15, 15, is for this reason always exerted substantially in the horizontal plane $a, a$ of the center of gravity A of the contact area, so as to secure a substantially uniform distribution of the wear over the entire surfaces of the lining portions 13 and 14; the relation thus established is automatically maintained, even in a tipped or out-of-level operating position of the roll and bearing, because no restraint to any slight resultant shifting of a spherical button 15 is imposed by the contact made with its dog's inner surface. Furthermore, said relation thus established is not appreciably disturbed by such vertical adjustment of the bearing in the housing as may be required to take up wear of the lining portion 13, or to vary the spacing between cooperating rolls. The range of vertical adjustment for bearing 12, within which a dog 17 is operative to retain the same in the manner above described, is, in the arrangement shown in Fig. 2, the distance between the points 15 and 15'; in other words, both of these points and every point between them satisfy the condition that the axis of bolt 16 shall be within the angle made by lines 22, 22 and 22', 22' connecting the points 15 and 15', respectively, with the extremities 21, 21 of the dog's contact with the housing.

In Fig. 4, I have illustrated a modification of my invention, wherein each bearing dog 23 is held by a pair of vertically spaced retaining bolts 24, 24, and in which, notwithstanding this variation, the three-point seating of the dog is adhered to, since the bearing 12' provides for cooperation with each dog, a single spherical button 25 substantially in the horizontal plane $a, a$ of the center of gravity A, and the dog provides the same two-point or line contact 26, 26 with the housing surface 27. In this instance, the range of vertical adjustment of a bearing so held is the distance between the points 25' and 25'', these being the inner terminals of lines from the points 26, 26 that pass inside the bolts 24, 24.

I claim,

1. In a rolling mill housing, a roll, a bearing for the neck of said roll, and a retaining means carried by said housing for contact with the end of said bearing, in all positions of the latter, at a single point substantially in the horizontal plane through the center of gravity of the bearing's contact with the shoulder between the roll barrel and the roll neck.

2. In a roll housing, the combination with a vertically adjustable roll-neck bearing, of an endwise retaining means for said bearing, and a substantially spherical projection on the end of said bearing adapted to be engaged by said retaining means, whereby the latter, irrespective of adjustments in the vertical position of said bearing, is always effective substantially in the plane of the center of gravity of the bearing's contact with the shoulder between the roll barrel and the roll neck.

3. In a roll housing, the combination with a roll-neck bearing, of clamping members to receive the end thrust of said bearing, and means for drawing said members into single-point contact with said bearing and two-point or line contact with said housing.

4. In a roll housing, the combination with a vertically adjustable roll-neck bearing, of endwise retaining devices therefor each making a one-point contact with said bearing and a two-point or line contact with said housing, in different positions, of vertical adjustment of said bearing.

5. In a roll housing, the combination with a vertically adjustable roll-neck bearing, of an endwise retaining device therefor, means for drawing said device into two-point contact with said housing, and a projection on the end of said bearing, for single-point contact with said retaining device, said projection being substantially in the plane of the center of gravity of the bearing's contact with the end of the roll barrel.

6. In a roll housing, a movably mounted roll-neck bearing having a portion contacting with the end of the roll barrel, and endwise retaining devices therefor each adapted to maintain a single-point contact with said bearing, substantially in the horizontal plane of the center of gravity of its area of contact with the roll barrel irrespective of limited changes in the vertical, horizontal, or level position of the bearing or of the roll whereby the retaining pressure of said devices is always in substantially the same predetermined relation to the area of the bearing's contact with the end of the roll barrel.

7. In a roll housing, the combination with a roll-neck bearing, of a pair of endwise retaining devices therefor, spherical projections on said bearing to provide a substantially single-point contact with each of said retaining devices, and means for drawing said retaining devices against said projections and into a two-point or line contact with said housing.

8. In a rolling mill housing, the combination with a vertically adjustable roll-neck bearing, of devices for the endwise retention of said bearing, and substantially spherical projections on the end of said bearing for engagement by said devices, whereby the latter are maintained, in various positions of vertical adjustment of said bearing, in single-point contact with said bearing, always substantially in the horizontal plane through the center of gravity of the latter's area of contact with the shoulder between the roll barrel and the roll neck.

9. In a rolling mill housing, the combination with a vertically adjustable roll-neck bearing, of devices for the endwise retention of said bearing, and substantially spherical projections on said bearing adapted to be engaged by said devices, whereby the latter are maintained in various positions of vertical adjustment of said bearing, in single-point contact with said bearing, and always in the horizontal plane through the center of gravity of the latter's area of contact with the roll body, and means for drawing each of said devices into two-point or line contact with said housing.

10. In a rolling mill housing, a roll-neck bearing, and devices for holding said bearing against endwise movement, comprising a fixed bolt projecting from said housing, and a clamping member held by said bolt in two-point or line contact at one end with said housing, and in single-point contact at the other end with said bearing.

11. In a rolling mill housing, devices for the endwise retention of a roll-neck bearing, each comprising a spherical projection on the outer end of said bearing substantially in the horizontal plane through the center of gravity of the contact area between the bearing and the end of the roll, a clamping member for contact at one end with said projection, and at the other end for two-point or line contact with said housing, and a fixed retaining means, projecting from said housing to engage and hold said clamping member in operative position.

12. In a roll housing, a roll-neck bearing mounted for vertical and horizontal adjustment, a clamp resting against the neck bearing at a single fixed point on one end and against the roll housing along a vertical line on the other end, and a single adjusting bolt acting on the clamp at a point falling inside a triangle, of which the point resting on the bearing is the apex, and the vertical line resting on the housing is the base.

13. In a roll housing, a roll-neck bearing mounted for vertical and horizontal adjustment, a clamp resting against the neck bearing at a fixed point on one end and against the roll housing along a vertical line at the other end, multiple retaining bolts, each acting on said clamp at a point falling outside of lines drawn between the point of contact between the clamp and the bearing and the two extremes of the line bearing between the clamp and the housing.

14. The combination with a clamp for holding a roll-neck bearing against horizontal movement in its housing, of retaining means for pressing one end of said clamp against the face of the housing and the other end against the neck bearing, said clamp having a single-point contact against the bearing and a line or two-point contact against the housing.

15. In a roll housing, a movably mounted roll-neck bearing, a raised spherical surface on the outer end of said bearing at a level substantially corresponding to the center of gravity of the area of the bearing's contact with the end of the roll, a clamp presenting a vertical surface in contact with said spherical surface, and means for horizontally moving said clamp to control the position of said bearing.

16. Means for retaining a roll bearing in a roll housing, comprising a clamping member making, at its opposite ends, single point contact with the bearing and two point contact with the housing, and a bolt for holding said member in place.

17. Retaining means to oppose endwise movement of a roll neck bearing in its housing, comprising a clamping member contacting near one end with a projection on said bearing, and near its other end with a surface of said housing, and a bolt carried by the housing between the ends of said clamping member for holding said clamping member by passage through an enlarged aperture thereof, to permit it to accommodate itself to different positions of said bearing.

18. Means for retaining a roll neck bearing in a roll housing, comprising a substantially spherical projection on the end of said bearing, located substantially in the horizontal plane of the bearing's center of contact with the end of the roll barrel, a clamping member contacting at one end with said projection, and at the other end with the housing, and a bolt intermediate said ends for securing said member in place.

JEROME R. GEORGE.